United States Patent
Yang et al.

(10) Patent No.: US 11,245,123 B2
(45) Date of Patent: Feb. 8, 2022

(54) SHUTDOWN CONTROL METHOD AND SHUTDOWN CONTROL SYSTEM OF FUEL CELL

(71) Applicants: Hyundai Motor Company, Seoul (KR); Kia Motors Corporation, Seoul (KR)

(72) Inventors: Sung Ho Yang, Gyeonggi-do (KR); Jae Hun Jang, Jeollanam-do (KR); Sung Mun Cho, Gyeonggi-do (KR); Kang Sik Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 76 days.

(21) Appl. No.: 16/574,853

(22) Filed: Sep. 18, 2019

(65) Prior Publication Data

US 2020/0313210 A1     Oct. 1, 2020

(30) Foreign Application Priority Data

Mar. 25, 2019  (KR) .......................... 10-2019-0033525

(51) Int. Cl.
*H01M 8/04223* (2016.01)
*H01M 8/04303* (2016.01)
*H01M 8/04828* (2016.01)
*H01M 8/04228* (2016.01)
*H01M 8/0432* (2016.01)
*H01M 8/04119* (2016.01)
*H01M 8/04955* (2016.01)

(52) U.S. Cl.
CPC ..... *H01M 8/04253* (2013.01); *H01M 8/0432* (2013.01); *H01M 8/04119* (2013.01); *H01M 8/04228* (2016.02); *H01M 8/04303* (2016.02); *H01M 8/04828* (2013.01); *H01M 8/04955* (2013.01)

(58) Field of Classification Search
CPC ......... H01M 8/04253; H01M 8/04303; H01M 8/04119; H01M 8/0432; H01M 8/04828; H01M 8/04955
See application file for complete search history.

(56) References Cited

U.S. PATENT DOCUMENTS

| | | | | |
|---|---|---|---|---|
| 2005/0257969 | A1* | 11/2005 | Osborne | H01M 8/04358 429/429 |
| 2007/0275281 | A1* | 11/2007 | White | H01M 8/04947 429/430 |
| 2007/0298289 | A1* | 12/2007 | Clingerman | H01M 8/0258 429/429 |
| 2020/0127311 | A1* | 4/2020 | Tanimoto | H01M 8/0491 |

FOREIGN PATENT DOCUMENTS

| KR | 101558361 B1 | 10/2015 |
|---|---|---|
| KR | 10-2018-0046622 A | 5/2018 |

* cited by examiner

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A shutdown control method of a fuel cell is provided. The method includes applying power to a controller in a shutdown state and determining, by the controller to which the power is applied, a possibility of moisture freezing based on an estimated outdoor temperature or the temperature of a fuel cell stack. A shutdown of the fuel cell is executed by performing moisture removal from the fuel cell stack in response to determining the possibility of moisture freezing after restart.

12 Claims, 3 Drawing Sheets

SHUTDOWN CONTROL METHOD AND SHUTDOWN CONTROL SYSTEM OF FUEL CELL

CROSS REFERENCE TO RELATED APPLICATION

The present application claims priority to Korean Patent Application No. 10-2019-0033525, filed on Mar. 25, 2019, the entire contents of which is incorporated herein for all purposes by this reference.

BACKGROUND

1. Field of the Disclosure

The present disclosure relates to a shutdown control method and a shutdown control system of a fuel cell, and more particularly, to a technique for controlling the shutdown of a fuel cell in the colder temperatures.

2. Description of the Prior Art

A fuel cell is a device that converts chemical energy into electrical energy using an oxidation-reduction reaction of hydrogen and oxygen respectively provided from a hydrogen supply device and an air supply device, and includes a fuel cell stack that produces electrical energy and a cooling system that cools the fuel cell stack. In other words, when hydrogen is supplied to an anode of the fuel cell stack, an oxidation reaction of hydrogen occurs at the anode to produce protons and electrons, which move to a cathode through an electrolyte membrane and a separation membrane. At the cathode, the protons and the electrons, which move from the anode, and oxygen in the air participate in an electrochemical reaction to form water. Through this flow of electrons, electrical energy is produced.

Generated water formed inside the fuel cell stack remains in the fuel cell stack. When the outside temperature is particularly cold, for example, in the winter season, there is the possibility that the generated water freezes when the fuel cell is in a shutdown state. When the generated water freezes inside the fuel cell stack, the water may cause a performance deterioration. Thus, it is important to discharge the generated water when the fuel cell is shut down. However, the process of discharging the generated water at shutdown generates a substantial amount of noise, causes a reduction in fuel efficiency due to the consumption of hydrogen, and increases the time for shutdown control. Thus, it is required to determine the possibility that generated water freezes and to limitedly discharge the generated water.

It should be noted that the foregoing description of the background art is made merely to enhance the understanding of the background of the present disclosure and is not to be construed as being acknowledged as the prior art already known to those skilled in the art.

SUMMARY

The present disclosure has been made to solve the above-mentioned problems in the prior art, and an aspect of the present disclosure provides shutdown control that determines the possibility that generated water freezes and limitedly discharges generated water from a fuel cell.

In accordance with an aspect of the present disclosure, a shutdown control method of a fuel cell may include: applying power to a controller in a shutdown state; determining, by the controller to which the power is applied, a possibility of moisture freezing based on an estimated outdoor temperature, a temperature of a fuel cell stack, or a measured outdoor temperature; and executing shutdown of the fuel cell by performing moisture removal from the fuel cell stack in response to determining the possibility of moisture freezing after restart.

The applying of the power to the controller may include activating the controller by applying power to the controller at preset wake-up time intervals in the shutdown state. The determining of the possibility of moisture freezing may include receiving the estimated outdoor temperature for a preset estimated time from an outside and determining that there is a possibility of moisture freezing when the estimated outdoor temperature decreases to below a preset first temperature within the preset estimated time. Additionally, the determining of the possibility of moisture freezing may include measuring the temperature of the fuel cell stack and determining that there is a possibility of moisture freezing when the measured temperature of the fuel cell stack decreases to below a preset second temperature.

The determining of the possibility of moisture freezing may further include determining that there is a possibility of moisture freezing when an outdoor temperature is reduced in the shutdown state based on the measured outdoor temperature and an outdoor temperature measured in the shutdown state. In addition, the determining of the possibility of moisture freezing may include determining that there is a possibility of moisture freezing when a temperature difference of the measured outdoor temperature minus an outdoor temperature measured in the shutdown state is less than a preset reference value. The preset reference value may be preset to increase as a change time, from the time of shutdown to a time of measurement of the outdoor temperature, increases.

The execution of the shutdown of the fuel cell may include omitting moisture removal control of the fuel cell stack in the shutdown state in response to determining that there is no possibility of moisture freezing. Additionally, the execution of the shutdown of the fuel cell may include discharging moisture out of the fuel cell stack by operating an air compressor configured to supply air to the fuel cell stack at a preset rotation speed when moisture removal control of the fuel cell stack is performed.

In accordance with an aspect of the present disclosure, a shutdown control system of a fuel cell may include: an input device configured to input an estimated outdoor temperature from an outside; a temperature sensor configured to measure a temperature of a fuel cell stack or an outdoor temperature; and a controller configured to determine a possibility of moisture freezing based on the estimated outdoor temperature input via the input device or the temperature of the fuel cell stack or the outdoor temperature measured by the temperature sensor when power is applied in a shutdown state and to execute shutdown of the fuel cell by performing moisture removal from the fuel cell stack in response to determining the possibility of moisture freezing after restart.

The shutdown control system of the fuel cell may further include a battery configured to apply power to the input device, the temperature sensor, or the controller to activate the input device, the temperature sensor, or the controller at preset wake-up time intervals in the shutdown state. The input device may be configured to receive the estimated outdoor temperature for a preset estimated time, and the controller may be configured to determine that there is a possibility of moisture freezing when the estimated outdoor temperature decreases to below a preset first temperature within the preset estimated time.

The controller may further be configured to determine that there is a possibility of moisture freezing when the temperature of the fuel cell stack, measured by the temperature sensor, decreases to below a preset second temperature. Additionally, the controller may be configured to determine that there is a possibility of moisture freezing when a temperature difference of the measured outdoor temperature minus an outdoor temperature measured in the shutdown state is less than a preset reference value, and the preset reference value may be preset to increase as a change time, from the time of shutdown to a time of measurement of the outdoor temperature, increases. The shutdown control system may further include: an air compressor configured to supply air to the fuel cell stack. The controller may be configured to execute moisture removal control of the fuel cell stack to discharge moisture out of the fuel cell stack by operate the air compressor configured to supply air to the fuel cell stack at a preset rotation speed in response to determining that there is a possibility of moisture freezing.

According to a shutdown control method and a shutdown control system of a fuel cell of the present disclosure, moisture removal control of a fuel cell stack may be limitedly included in shutdown control of the fuel cell to prevent unnecessary hydrogen consumption and power waste, thereby improving fuel efficiency. Further, when moisture removal control of a fuel cell stack is omitted, it may be possible to reduce the time consumed for the shutdown of a fuel cell and to reduce the occurrence of noise, thereby improving merchantable quality.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
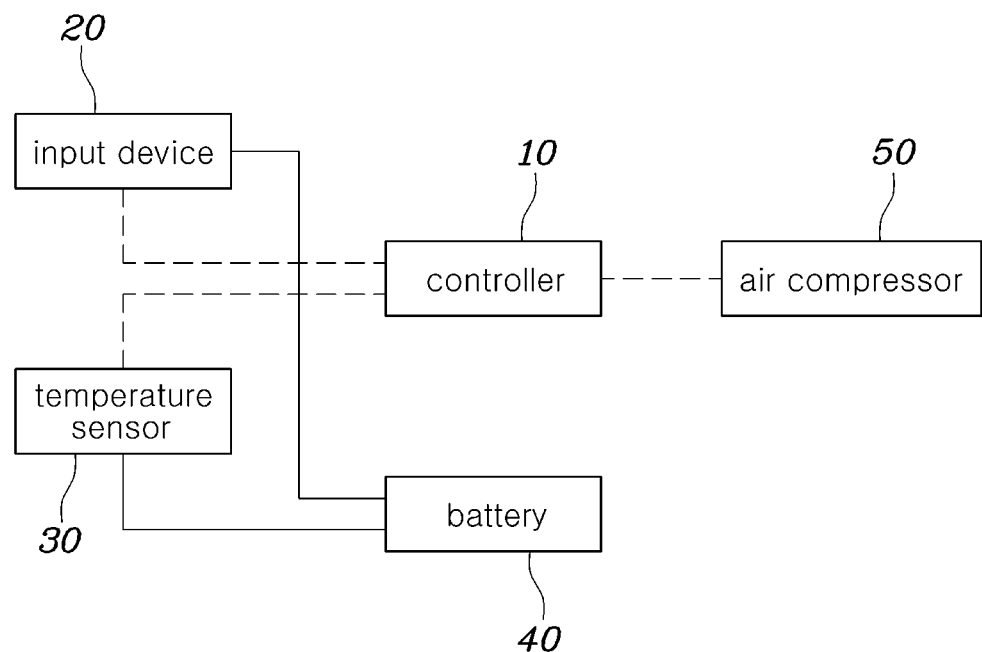
FIG. 1 illustrates the configuration of a shutdown control system of a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of exemplary embodiments of the present disclosure disclosed in the specification or application is given merely for the purpose of describing the embodiment according to the present disclosure. Therefore, the exemplary embodiments according to the present disclosure may be implemented in various forms, and the present disclosure should not be construed as being limited to the embodiments described in the specification or application.

Various changes and modifications may be made to the exemplary embodiments according to the present disclosure, and therefore particular exemplary embodiments will be illustrated in the drawings and described in the specification or application. However, it should be understood that exemplary embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings. Similar reference numerals presented in the drawings denote similar elements.

FIG. 1 illustrates the configuration of a shutdown control system of a fuel cell according to an exemplary embodiment of the present disclosure. Referring to FIG. 1, the shutdown control system of the fuel cell according to the exemplary embodiment of the present disclosure may include: an input device 20 configured to input an estimated outdoor temperature from the outside; a temperature sensor 30 configured to measure the temperature of a fuel cell stack; and a controller 10 configured to determine the possibility of moisture freezing based on an estimated outdoor temperature input through the input device 20, the temperature of the fuel cell stack measured by the temperature sensor 30, or a measured outdoor temperature when power is applied in a shutdown state and to execute the shutdown of the fuel cell by performing moisture removal from the fuel cell stack in response to determining the possibility of moisture freezing after restart.

Accordingly, moisture removal control of the fuel cell stack may be limitedly performed when shutdown control of the fuel cell to prevent unnecessary hydrogen consumption and power waste, thereby improving fuel efficiency. The input device 20 may be connected to an external device via a communication medium such as the Internet or the like, and may be configured to receive an estimated outdoor temperature. In particular, the input device 20 may be an audio-video-navigation (AVN) system serving as an in-vehicle infotainment system, and may be configured to receive an estimated outdoor temperature for an area from a weather center.

The temperature sensor 30 may be configured to measure the internal temperature of the fuel cell stack. In particular, the temperature sensor 30 may be configured to directly measure the internal temperature of the fuel cell stack or estimate the internal temperature of the fuel cell stack by measuring the temperature of a coolant at an outlet. The controller 10 may be a controller 10 configured to separately execute the shutdown of the fuel cell, or may be a controller 10 included in a fuel cell control unit (FCU).

According to an exemplary embodiment of the present disclosure, the controller 10 may be configured to include a nonvolatile memory (not shown) configured to store data relating to an algorithm configured to operate various components of a vehicle or software instructions to execute the algorithm and a processor (not shown) configured to perform the following operations using the data stored in the memory. In particular, the memory and the processor may be configured as separate chips. Alternatively, the memory and the processor may be configured as a single integrated chip. The processor may include one or more processors.

When power is applied in the shutdown state, the controller 10 may be configured to determine the possibility of moisture freezing based on an estimated outdoor temperature input through the input device 20, the temperature of the fuel cell stack measured by the temperature sensor 30, or a measured outdoor temperature and may be configured to execute moisture removal from the fuel cell stack in response to determining the possibility of moisture freezing after restart. In particular, the moisture removal may either be executed or prevented from being executed based on particular conditions discussed herein below. Generally, in a shutdown (key-off) state of a fuel cell system, the controller 10 is powered off when a power supply is cut, while the controller 10 may be powered on when activated by wake-up control at certain time intervals.

The shutdown control system may further include a battery 40 configured to apply power to the input device 20, the temperature sensor 30, or the controller 10 to activate the input device 20, the temperature sensor 30, or the controller 10 at preset wake-up time intervals in the shutdown state. The battery 40 charged with power may be configured to discharge power to apply power to the input device 20, the temperature sensor 30, or the controller 10 at a low voltage (12 V or 24 V). Specifically, the input device 20 may be configured to receive an estimated outdoor temperature for a preset estimated time, and the controller 10 may be configured to determine that there is a possibility of moisture freezing when the estimated outdoor temperature decreases to below a preset first temperature within the preset estimated time.

The controller 10 may also be configured to determine that there is a possibility of moisture freezing when the temperature of the fuel cell stack measured by the temperature sensor 30 decreases to below a preset second temperature. The controller 10 may be configured to determine that there is a possibility of moisture freezing when a temperature difference of a measured outdoor temperature minus an outdoor temperature measured in the shutdown state is less than a preset reference value, and the preset reference value may be preset to increase as a change time, from the time of shutdown to the time of measurement of the outdoor temperature, increases.

The shutdown control system may further include an air compressor 50 configured to supply air to the fuel cell stack. When determining that there is a possibility of moisture freezing, the controller 10 may be configured to operate the air compressor 50 configured to supply air to the fuel cell stack at a preset rotation speed at shutdown, thereby performing moisture removal control of the fuel cell stack that discharges moisture out of the fuel cell stack. The air compressor 50 may be configured to supply air to the fuel cell stack through an air supply line, and the controller 10 may be configured to operate the air compressor 50 at the preset rotation speed, thereby discharging moisture out of the fuel cell stack. The preset rotation speed may be preset to the maximum speed of the air compressor 50 and may be maintained for a preset time.

Figure 2:
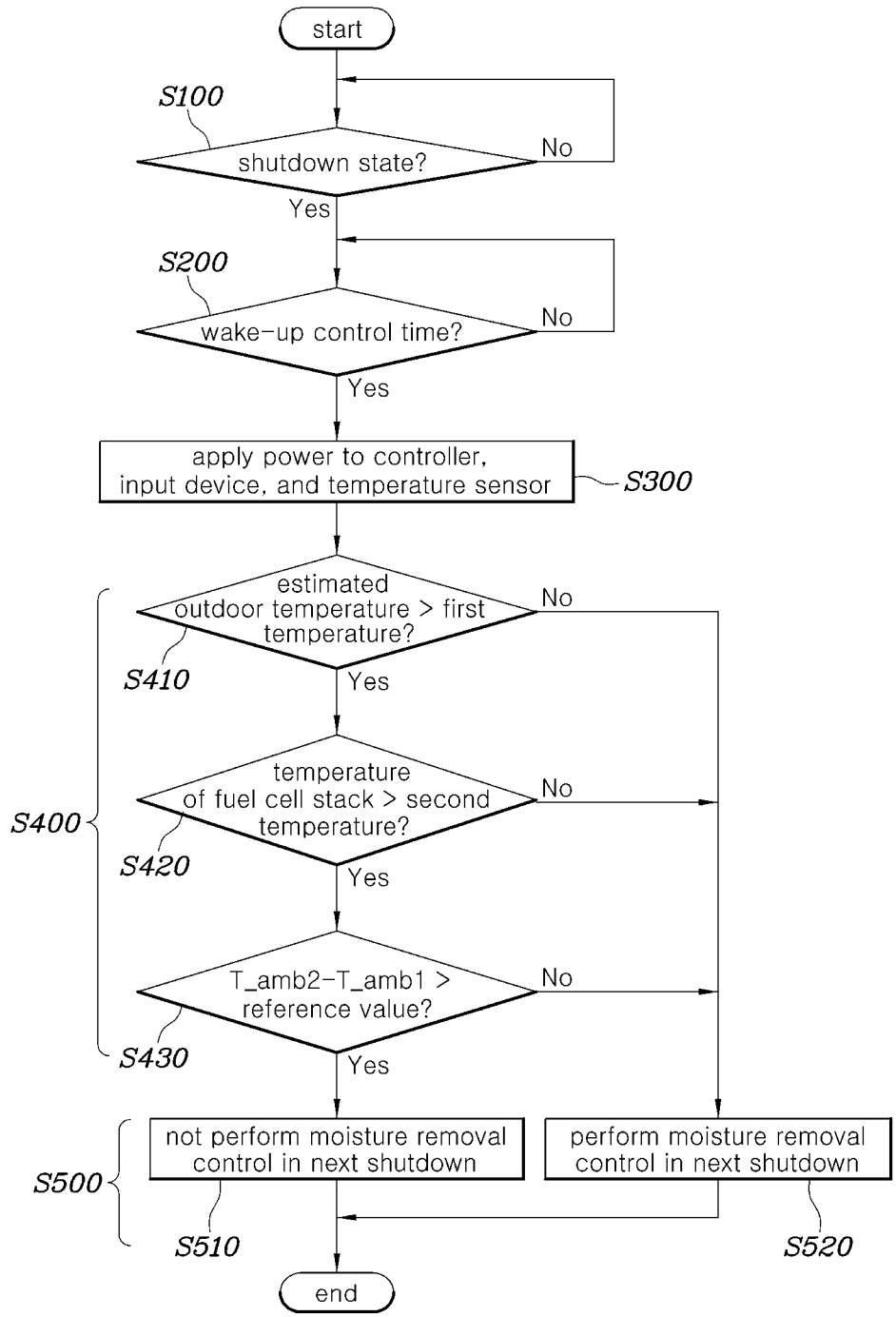
FIG. 2 is a flowchart illustrating a shutdown control method of a fuel cell according to an exemplary embodiment of the present disclosure.

FIG. 2 is a flowchart illustrating a shutdown control method of a fuel cell according to an exemplary embodiment of the present disclosure. Referring further to FIG. 2, the shutdown control method of the fuel cell according to the exemplary embodiment of the present disclosure may include: applying power to the controller 10 in a shutdown state (S300); determining, by the controller 10 having power applied thereto, the possibility of moisture freezing based on an estimated outdoor temperature, the temperature of a fuel cell stack, or a measured outdoor temperature (S400); and executing the shutdown of the fuel cell by performing moisture removal from the fuel cell stack following the determined possibility of moisture freezing after restarted (S500).

In the operation S300 of applying power to the controller 10, the controller 10 may be activated (S200) by applying power to the controller 10 at preset wake-up time intervals in the shutdown state (S100). In other words, power of the battery 40 may be applied to the controller 10 to power on the controller 10. Further, the battery 40 may be configured to apply power to the input device 20 and the temperature sensor 30 to activate the input device 20 and the temperature sensor 30.

Specifically, in the operation S400 of determining the possibility of moisture freezing, an estimated outdoor temperature for a preset estimated time may be received from the outside, and when the estimated outdoor temperature decreases to below a preset first temperature within the preset estimated time, the controller 10 may be configured to determine that there is a possibility of moisture freezing (S410). However, when the estimated outdoor temperature does not decrease to below the preset first temperature within the preset estimated time, the controller 10 may be configured to determine that there is no possibility of moisture freezing.

The preset estimated time may be preset to 24 hours or 48 hours, and the estimated outdoor temperature for the preset estimated time from the current time to a future time may be input. The estimated outdoor temperature may be, for example, an outdoor temperature measured at an interval of one hour. The first temperature may be preset to a temperature at which there is a possibility of moisture freezing, for example, about 0° C. Further, in the operation S400 of determining the possibility of moisture freezing, the temperature of the fuel cell stack may be measured, and when the measured temperature of the fuel cell stack decreases to below a preset second temperature, the controller 10 may be configured to determine that there is a possibility of moisture freezing (S420).

To obtain the temperature of the fuel cell stack, the internal temperature of the fuel cell stack may be directly measured using the temperature sensor 30, or the internal temperature of the fuel cell stack may be estimated by measuring the temperature of a coolant that cools the fuel cell stack at an outlet thereof. In particular, despite the shutdown state, a cooling pump may be operated to circulate the coolant that cools the fuel cell stack during wake-up control, thereby enabling accurate estimation of the temperature of the fuel cell stack.

When the measured temperature of the fuel cell stack does not decrease to below the preset second temperature, the controller 10 may be configured to determine that there is no possibility of moisture freezing. In other words, when the estimated outdoor temperature decreases to below the preset first temperature or when the internal temperature of the fuel cell stack is less than the second temperature, the controller 10 may be configured to determine that there is a possibility of moisture freezing. However, even though the estimated outdoor temperature does not decreases to below the preset first temperature and the internal temperature of the fuel cell stack does not decrease to below the second temperature, it may be possible to determine whether there is a possibility of moisture freezing based on whether an outdoor temperature is reduced.

In the operation S400 of determining the possibility of moisture freezing, when an outdoor temperature is reduced in the shutdown state based on the measured outdoor temperature and an outdoor temperature measured in the shutdown state, the controller 10 may be configured to determine that there is a possibility of moisture freezing (S430). The temperature sensor 30 may be configured to measure an outdoor temperature (T_amb2) in the current state. The controller 10 may then be configured to compare the current outdoor temperature (T_amb2) measured by the temperature sensor 30 with a previous outdoor temperature (T_amb1) measured in the shutdown state and determine whether the outdoor temperature is reduced in the shutdown state. When the outdoor temperature is increased, the controller 10 may be configured to determine that there is no possibility of moisture freezing.

Figure 3:
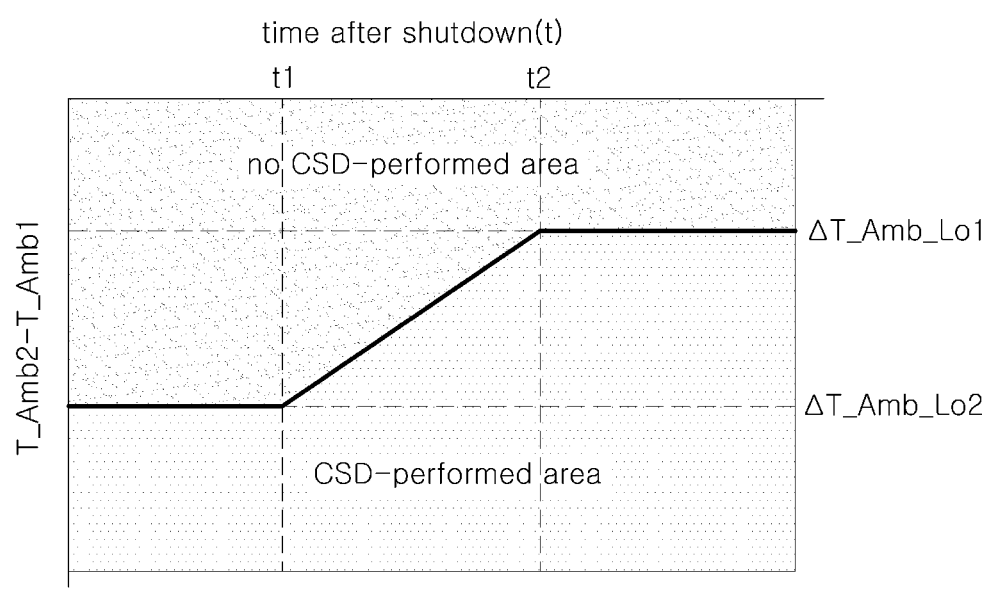
FIG. 3 is a graph illustrating a relationship between a change time and a reference value according to an exemplary embodiment of the present disclosure.

FIG. 3 is a graph illustrating the relationship between a change time and a reference value according to an exemplary embodiment of the present disclosure. Referring further to FIG. 3, according to one exemplary embodiment, in the operation S400 of determining the possibility of moisture freezing, when a temperature difference of the measured outdoor temperature minus the outdoor temperature measured in the shutdown state is less than a preset reference value, the controller 10 may be configured to determine that there is a possibility of moisture freezing (S430).

When the temperature difference (T_amb2−T_amb1) of the measured outdoor temperature (T_amb2) minus the outdoor temperature (T_amb1) measured in the shutdown state is 0 or greater, the controller 10 may be configured to determine that the outdoor temperature is increased and thus that there is no possibility of moisture freezing. However, when the temperature difference (T_amb2−T_amb1) of the measured outdoor temperature (T_amb2) minus the outdoor temperature (T_amb1) measured in the shutdown state is less than 0, the controller 10 may be configured to determine that the outdoor temperature is reduced.

Particularly, when the temperature difference (T_amb2−T_amb1) of the measured outdoor temperature (T_amb2) minus the outdoor temperature (T_amb1) measured in the shutdown state is less than the preset reference value and the temperature is considerably reduced, the controller 10 may be configured to determine that there is a possibility of moisture freezing. Specifically, the preset reference value may be set to increase as a change in time, from the time of shutdown to the time of measurement of the outdoor temperature, increases. In other words, when the change time is greater than a predetermined time period, the reference value may be set to determine that there is a possibility of moisture freezing even though the outdoor temperature is relatively minimally reduced.

As illustrated, in a certain range (t1 to t2) of the change time, the preset reference value may be preset to increase as the change time increases. When the change time is less than a certain time (t1) or is greater than a certain time (t2), the reference value may be preset to be constant even though the change time changes. In an operation S500 of executing the shutdown of the fuel cell, in response to determining that there is no possibility of moisture freezing, moisture removal control (CSD) of the fuel cell stack may be performed (S510).

The controller 10 may be configured to determine whether to perform moisture removal control (CSD) of the fuel cell stack in subsequent shutdown control after the next startup in the shutdown state, and subsequent shutdown control after restarting may be performed based on the determination result. In other words, the possibility of moisture freezing may be determined in a plurality of stages, and moisture removal control (CSD) of the fuel cell stack may be included only when there is a possibility of moisture freezing, thereby preventing unnecessary moisture removal control (CSD).

In the operation S500 of executing the shutdown of the fuel cell, when moisture removal control (CSD) of the fuel cell stack is performed, the air compressor 50, configured to supply air to the fuel cell stack, may be operated at a preset rotation speed, thereby discharging the moisture in the fuel cell stack to the outside (S520). The preset rotation speed may be preset to the maximum speed of the air compressor 50, and may be maintained for a preset time, thereby discharging moisture in an air supply line connected to the fuel cell stack and moisture inside the fuel cell stack to the outside.

Although the present disclosure has been described and illustrated with reference to the exemplary embodiments thereof, it will be apparent to those skilled in the art that various improvements and modifications of the present disclosure may be made without departing from the technical idea of the present disclosure provided by the following claims.

What is claimed is:

1. A shutdown control method of a fuel cell, comprising:
applying power to a controller in a shutdown state;
determining, by the controller to which the power is applied, a possibility of moisture freezing based on an estimated outdoor temperature, a temperature of a fuel cell stack, or a measured outdoor temperature; and
executing, by the controller, a shutdown of the fuel cell by performing moisture removal from the fuel cell stack in response to determining the possibility of moisture freezing after restart,
wherein the determining of the possibility of moisture freezing includes determining, by the controller, that there is a possibility of moisture freezing when a temperature difference of the measured outdoor temperature minus an outdoor temperature measured in the shutdown state is less than a preset reference value, and
wherein the preset reference value is preset to increase as a change in time from the time of shutdown to a time of measurement of the outdoor temperature increases.

2. The shutdown control method of the fuel cell of claim 1, wherein the applying of the power to the controller includes activating the controller by applying power to the controller at preset wake-up time intervals in the shutdown state.

3. The shutdown control method of the fuel cell of claim 1, wherein the determining of the possibility of moisture freezing includes receiving, by the controller, the estimated outdoor temperature for a preset estimated time from an outside and determining that them is a possibility of moisture freezing when the estimated outdoor temperature decreases to below a preset first temperature within the preset estimated time.

4. The shutdown control method of the fuel cell of claim 1, wherein the determining of the possibility of moisture freezing includes measuring, by the controller, the temperature of the fuel cell stack and determining that there is a possibility of moisture freezing when the measured temperature of the fuel cell stack decreases to below a preset second temperature.

5. The shutdown control method of the fuel cell of claim 1, wherein the determining of the possibility of moisture freezing includes determining, by the controller, that them is a possibility of moisture freezing when an outdoor temperature is reduced in the shutdown state based on the measured outdoor temperature and an outdoor temperature measured in the shutdown state.

6. The shutdown control method of the fuel cell of claim 1, wherein the execution of the shutdown of the fuel cell includes omitting moisture removal control of the fuel cell stack in response to determining that there is no possibility of moisture freezing.

7. The shutdown control method of the fuel cell of claim 1, wherein the execution of the shutdown of the fuel cell includes discharging, by the controller, moisture out of the fuel cell stack by operating an air compressor configured to supply air to the fuel cell stack at a preset rotation speed when moisture removal control of the fuel cell stack is performed.

8. A shutdown control system of a fuel cell, comprising:
an input device configured to input an estimated outdoor temperature from an outside;
a temperature sensor configured to measure a temperature of a fuel cell stack or an outdoor temperature; and
a controller configured to determine a possibility of moisture freezing based on the estimated outdoor temperature input via the input device or the temperature of the fuel cell stack or the outdoor temperature measured by the temperature sensor when power is applied in a shutdown state and to execute a shutdown of the fuel cell by performing moisture removal from the fuel cell stack in response to determining the possibility of moisture freezing after restart,
wherein the controller is configured to determine that there is a possibility of moisture freezing when a temperature difference of the measured outdoor temperature minus an outdoor temperature measured in the shutdown state is less than a preset reference value, and the preset reference value is preset to increase as a change in time from the time of shutdown to a time of measurement of the outdoor temperature increases.

9. The shutdown control system of the fuel cell of claim 8, further comprising:
a battery configured to apply power to the input device, the temperature sensor, or the controller to activate the input device, the temperature sensor, or the controller at preset wake-up time intervals in the shutdown state.

10. The shutdown control system of the fuel cell of claim 8, wherein the input device is configured to receive the estimated outdoor temperature for a preset estimated time, and the controller is configured to determine that there is a possibility of moisture freezing when the estimated outdoor temperature decreases to below a preset first temperature within the preset estimated time.

11. The shutdown control system of the fuel cell of claim 8, wherein the controller is configured to determine that there is a possibility of moisture freezing when the temperature of the fuel cell stack measured by the temperature sensor decreases to below a preset second temperature.

12. The shutdown control system of the fuel cell of claim 8, further comprising:
an air compressor configured to supply air to the fuel cell stack,
wherein the controller is configured to perform moisture removal control of the fuel cell stack to discharge moisture out of the fuel cell stack by operating the air compressor configured to supply air to the fuel cell stack at a preset rotation speed in response to determining that there is a possibility of moisture freezing.

\* \* \* \* \*